(12) United States Patent
Aston et al.

(10) Patent No.: US 10,666,738 B2
(45) Date of Patent: May 26, 2020

(54) MANAGING TOPIC UPDATES FOR A DISTRIBUTED DATA SYSTEM

(71) Applicant: PUSH TECHNOLOGY LIMITED, Maidenhead (GB)

(72) Inventors: Philip Allan George Aston, Maidenhead (GB); Peter Hughes, Maidenhead (GB); Patrick Joseph Walsh, Maidenhead (GB)

(73) Assignee: Push Technology Limited, Maidenhead (GB)

( * ) Notice: Subject to any disclaimer, the term of this patent is extended or adjusted under 35 U.S.C. 154(b) by 87 days.

(21) Appl. No.: 15/765,487

(22) PCT Filed: Oct. 17, 2016

(86) PCT No.: PCT/US2016/057423
§ 371 (c)(1),
(2) Date: Apr. 2, 2018

(87) PCT Pub. No.: WO2017/066805
PCT Pub. Date: Apr. 20, 2017

(65) Prior Publication Data
US 2018/0255146 A1    Sep. 6, 2018

Related U.S. Application Data

(60) Provisional application No. 62/242,201, filed on Oct. 15, 2015.

(51) Int. Cl.
*H04L 29/08* (2006.01)
*G06F 16/27* (2019.01)
*G06F 16/31* (2019.01)

(52) U.S. Cl.
CPC ............ *H04L 67/141* (2013.01); *G06F 16/27* (2019.01); *G06F 16/322* (2019.01); *H04L 67/26* (2013.01); *H04L 67/02* (2013.01); *H04L 67/289* (2013.01)

(58) Field of Classification Search
CPC ....... H04L 67/141; H04L 67/26; H04L 67/02; H04L 67/289; G06F 16/27; G06F 16/322
See application file for complete search history.

(56) References Cited

U.S. PATENT DOCUMENTS 6,751,463 B1   6/2004  Lorello et al.
8,244,810 B1   8/2012  Haldar
(Continued)

FOREIGN PATENT DOCUMENTS

WO   WO 2009/032493 A1   3/2009
WO   WO 2014/072746 A1   5/2014

OTHER PUBLICATIONS

PCT International Search Report and Written Opinion, PCT/US2016/057423, dated Jan. 9, 2017, 13 Pages.
(Continued)

*Primary Examiner* — Michael A Keller
(74) *Attorney, Agent, or Firm* — Fenwick & West LLP (57) ABSTRACT

To represent the indirect lifecycle binding between the validity of data for a given topic, and the presence of sessions responsible for updating the data associated with that topic, sessions may register a policy referred to herein as a "session will" against specific nodes in the topic tree maintained by a data distribution system server. A session will binds the lifecycle of the topic node to that of the registering session. When a session that is responsible for updating a particular topic is disconnected, the data distribution system server initiates actions in accordance with the
(Continued)

session will to determine how to manage updating the topic and the sub-topics in the topic path.

18 Claims, 4 Drawing Sheets

(56) References Cited

U.S. PATENT DOCUMENTS

| | | | |
|---|---|---|---|
| 2003/0188198 A1* | 10/2003 | Holdsworth | G06F 21/6218 726/1 |
| 2006/0047666 A1* | 3/2006 | Bedi | G06F 16/958 |
| 2011/0138400 A1 | 6/2011 | Chandler et al. | |
| 2012/0233268 A1* | 9/2012 | Bedi | H04L 51/14 709/206 |
| 2014/0324959 A1 | 10/2014 | Hudson | |

OTHER PUBLICATIONS

International Search Report and Written Opinion, PCT Application No. PCT/GB2013/052972, dated Dec. 13, 2013, 10 pages.

\* cited by examiner

MANAGING TOPIC UPDATES FOR A DISTRIBUTED DATA SYSTEM

1. FIELD OF ART

This disclosure generally relates to the field of data distribution via a computer network, and more specifically, to managing a data model for a distributed data system.

2. BACKGROUND

The increased demand for data means that business systems and applications must exchange data efficiently and intelligently at scale with devices, browsers, and other applications over the Internet. To meet this increased demand for data, some data distribution platforms employ a publish-subscribe model in which senders of messages, called control clients, publish messages into classes (e.g., topics) without knowledge of subscribers who may receive the messages. Subscribers in a topic-based publish-subscribe system will receive all messages published to the topics to which they subscribe, and all subscribers to a topic will receive the same messages. Control clients establish a session with the server to create and maintain topics and clients establish a session with the server to consume data published by the control clients. In the event that the session(s) updating a given topic disconnect, this can result in situations where client sessions are consuming "stale" data.

The figures depict embodiments for purposes of illustration only. One skilled in the art will readily recognize from the following description that alternative embodiments of the structures and methods illustrated herein may be employed without departing from the principles of the invention described herein.

DETAILED DESCRIPTION

Data Distribution System Architecture

Figure 1:
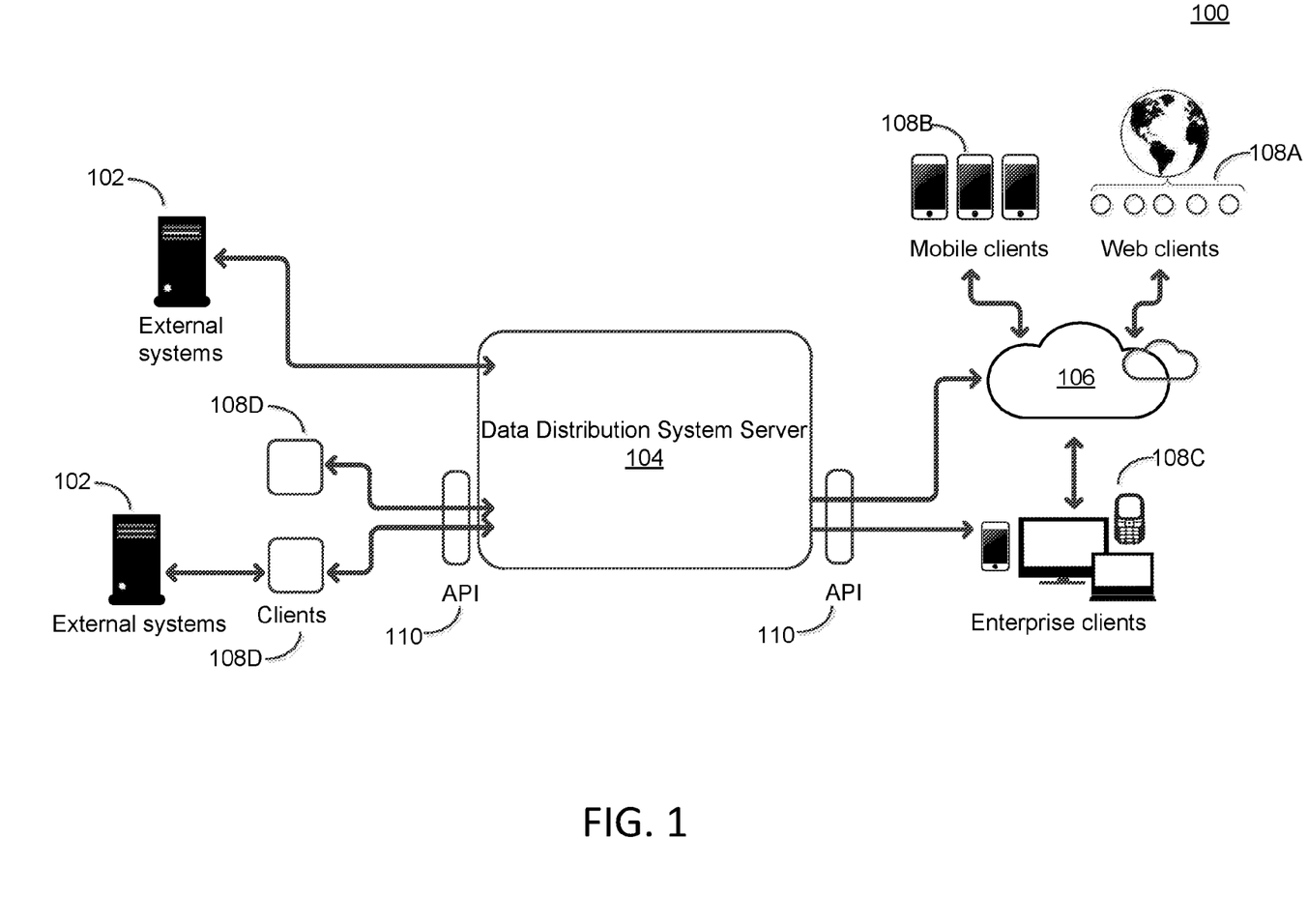
FIG. 1 is a block diagram of a data distribution system, according to one embodiment.

FIG. 1 is a block diagram of a data distribution system 100, according to one embodiment. One or more external systems 102 interact with the data distribution system server 104 to distribute data to multiple clients 108 over a network 106. An external system 102 may be a server associated with a data source for distribution via the data distribution system 100. Example data sources include entities such as a stock exchange, an online game provider, a media outlet, or other source that distributes topical data to users over a network, such as the Internet.

The external system 102 communicates with the data distribution system server 104 via a hosted application called "publisher," which enables the external system to create and maintain topics on the data distribution server 104 for distribution to multiple clients. Alternatively, topics may be maintained by a separate client process external to the data distribution system server 104. Such clients 108 are referred to as control clients.

A client 108 is an application that communicates with the data distribution system server 104 using one or more specified client protocols. Example client protocols include WebSocket (WS) and Hypertext Transfer Protocol (HTTP). Some clients 108 connect to the data distribution system server 104 to subscribe to topics and receive message data on those topics. Other clients 108, which have different permissions, perform control actions such as creating and updating topics or handling events.

In the embodiment shown in FIG. 1, the data distribution system 100 includes different categories of clients 108, including web 108A, mobile 108B, and enterprise 108C clients. Web clients 108A include browser applications that use JavaScript, ActionScript®, or Silverlight® APIs. Mobile clients 108B may be mobile applications that interact with the data distribution system server 104 using iOS or Android APIs. Enterprise clients 108C may be any application connecting to the data distribution system server 104 over a data distribution system server protocol for Transmission Control Protocol (TCP) over the Internet or an intranet/extranet using Java, .Net, or C APIs.

Generally, clients 108 interact with the data distribution system server 104 using an API 110. The API 110 may include the libraries appropriate to the platform executing the client application. The category of client depends on the language of the API 110 and libraries used to implement it. Clients 108 may be implemented in one of a number of languages and use variety of protocols to communicate with the server. Clients 108 may perform different types of actions depending on their permissions and the capabilities of the API 110 they use.

Clients 108 used by data consumers typically subscribe to topics and receive updates that are published to these topics from the data distribution system server 104. Clients 108D used by data providers typically create, manage, and update topics. These clients 108D also take responsibility for control functions, for example authenticating and managing other client sessions.

The data distribution system server 104 hosts publisher applications, manages connections from clients 114, pushes data to clients 108 through message queues, and manages the life cycle of data for a given topic received by a control client 108D. When sessions responsible for updating the data associated with a topic are interrupted or terminated, the data distribution system server 104 applies a policy referred to herein as a "session will" against a topic path in the topic tree maintained by a data distribution system server 104. A session will binds the lifecycle of the topic node included in the specified topic path to that of the registering session. When a session that is responsible for updating a topic included in the topic path is disconnected, the data distribution system server 104 initiates actions in accordance with the session will to determine how to manage updating the topics and the sub-topics in the topic path.

Figure 2:
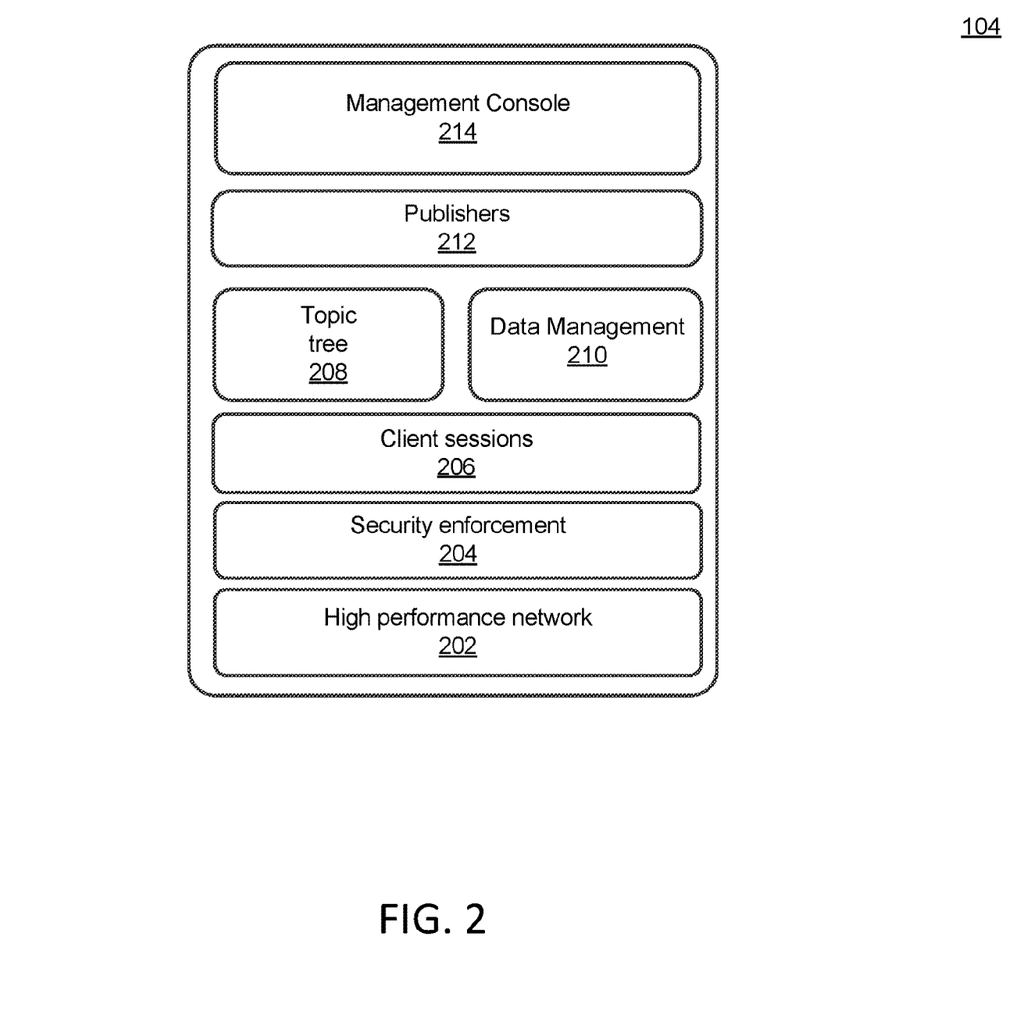
FIG. 2 is a block diagram illustrating components of the data distribution system server, from FIG. 1, according to one embodiment.

FIG. 2 is a block diagram illustrating components of the data distribution system server 104, from FIG. 1, according to one embodiment. The data distribution system server 104 may be a standalone server or part of a cluster of servers to provide a scalable enterprise data distribution solution. The data distribution system server 104 pushes (streams) and receives data and events, in real-time, both to and from client applications. The data distribution system server 104 includes a high performance network layer 202, security enforcement module 204, client session module 206, topic tree 208, data management module 210, publishers 212, and a management console 214.

The high performance network layer 202 handles a high number of concurrent connections without the need for separate threads. Connectors handle connections from many different types of clients 108 and for various protocols. Connectors may be configured to listen on different ports. Multiple clients may connect to a single port.

The security enforcement module 204 authenticates connections from clients 108 and manages authorization and setting permissions for actions that those clients 108 can take when they are connected to the data distribution system sever 104.

The client sessions module 206 manages the sessions for the clients 108 that connect to the data distribution system server 104. Sessions connect clients 108 to the data distribution system server 104 to modify or consume values from the topic tree 208. In operation, the data distribution system server 104 will typically contain a small number of sessions that control and update the topic tree 208, with a significantly larger number of sessions solely consuming this data. The client session module 206 stores information about the client 108, client sessions, client's subscriptions, and policies for managing topic data related to the client's subscriptions and client's session status. For example, if a consuming client disconnects, it can reconnect to the same session within a specified time period using the information stored in the client session module 206. If a control client 108D disconnects, the client session module 206 applies the session will associated with the specific nodes in the topic tree 208 bound to the registering session of the disconnected control client 108D.

The client sessions module 206 maintains session wills within a sparse hierarchical data structure referred to as a "session will registry" that shadows the primary topic tree 208, but contains the nodes required to represent a linear tree for each path that a session will has been registered for. The session will registry may be stored in one or more storage devices or components located in or accessible by the data distribution system server 104.

The data management module 210 performs operations on the data to more efficiently deliver it to clients 108. Example operations include structural conflation, merging, and replacing data to ensure that the latest data is received by the client.

The management console 214 may operate as an optional publisher that is deployed by default. The management console 214 may be used to monitor the operations of the data distribution system server 104 through a web browser and to stop and start publishers 212 within the data distribution system server 104.

Publishers 212 are components hosted within the data distribution system server 104 that manage the data for one or more topics and publish messages to any clients 108 that subscribe to the topics that the publisher manages. In one example, publishers 212 are written using the Java API and extend the issued publisher class and implement various methods to provide the publisher functionality. A publisher 212 maintains its own data model. The publisher 212 initializes its data as it starts and updates it as a result of external events. When a client 108 first subscribes to a topic, the publisher 212 provides the client 108 with a snapshot of the current state of the data relating to that topic. This is referred to as a "topic load." A client 108 can also request the current state of a topic, even if not subscribed to it, using the "fetch" command.

A publisher 212 maintains any changes to its topic data state and publishes those changes to the topic as delta messages. This results in the message being sent to every client 108 that is subscribed to the topic. Publishers 212 can send messages to individual clients 108 or to groups of clients 108 and can receive messages from clients 108. The publisher 212 does not need to know or keep track of the clients 108 subscribed to its topics. Publishers 212, however, may know or keep track of clients 108 if the publisher 212 wishes to directly interact with the client 108. Publishers 212 own the topics they create. Ownership of a topic is used to determine which publisher 212 receives a message from a client 108, deals with subscription, and/or creates dynamic topics. Publishers 212 hosted in the data distribution system server 104 may act as client applications to other data distribution system servers 104. A publisher 212 may do this by subscribing to topics on the other servers to create a distributed architecture.

The topic tree 208 represents a data model of the organizational structure of the topics available to be published to clients 108. The topic tree 208 is arranged hierarchically and comprised of top-level topics with subordinate topics. These subordinate topics can themselves have subordinate topics. A topic of any type can be bound to any node of the topic tree 208. Each node within the topic tree 208 may have a topic associated with it and each topic may maintain a stateful data value indicating the current state of the data relating to a particular topic. Each node may correspond to a different topic. Several topics may point to the same data. A single topic may point to a different topic for each client 108. Alternatively, a topic may be a vehicle for streaming values without retaining a stateful data.

Figure 3:
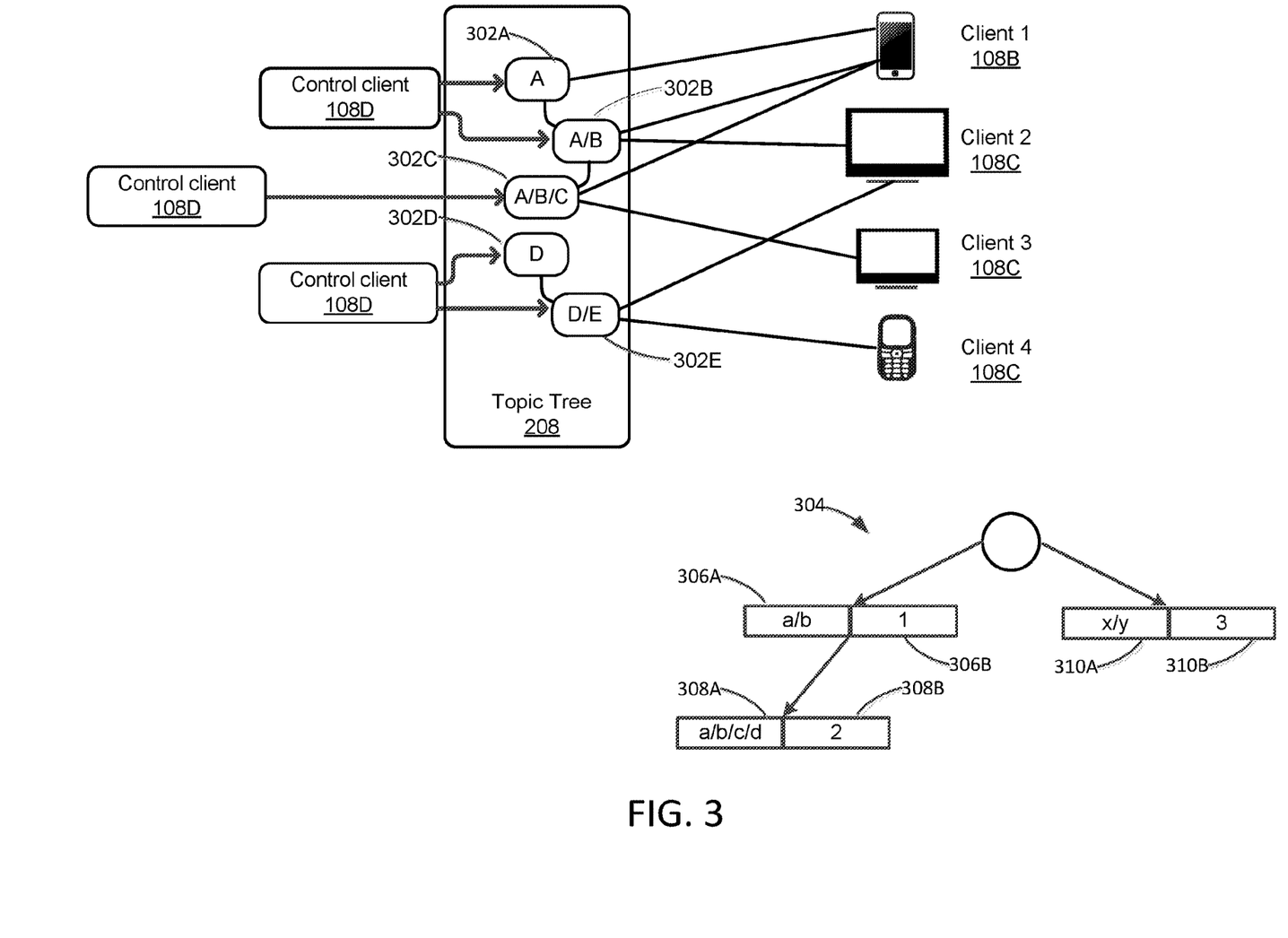
FIG. 3 is a diagram illustrating the logical connections between a control client and clients based on topics, according to one embodiment.

FIG. 3 is a diagram illustrating a topic tree 208 comprised of logical connections between control clients 108D and clients 108 based on topics 302, according to one embodiment. The data model represented by the topic tree 208 shows the relationships between clients 108, control clients 108D, and the topics 302 maintained by the data distribution system server 204. Clients 108 and control clients 108D are loosely coupled through logical links representing the topics 302. A control client 108D publishes messages to a topic 302 and a client 108 subscribes to a topic 302 and receives its messages. A topic path may also be used by a client 108 to send messages to the control client 108D that receives messages on that topic path. The client 108 is aware of the topic path, but unaware of the control client 108D. Topics 302 are created in the data distribution system server 104 by control clients 108D. Each topic 302 has a unique name within the data distribution system server 104. As shown in FIG. 3, the topic names are A, B, C, D, and E.

In one example, topics 302 may be arranged in a tree structure. Tree structure includes nodes corresponding to topics joined together by a topic path. In the embodiment shown in FIG. 3, Topic B 302B is beneath topic A 302A in the topic tree 208 and topic E 302E is beneath topic D 302D in the topic tree 208. The location of the topic 302 in the topic tree 208 is described by the topic path. The topic path includes all the topics above it in the topic tree 208 in an order separated by the slash character (/). For example, the path to topic B 302B is A/B and the path to topic E 302E is D/E. The topic tree 208 may include any number of topics 302.

Hierarchy Index Overview

As discussed with reference to FIG. 3, the data model corresponding to the topic tree 208 within the data distribution system server 104 is designed as an unbounded tree. Each node within the topic tree 208 is a concrete object that maintains a reference to its parent node and a collection of references to its child node(s). Traversal over a single branch (from child to root or root to child) of the topic tree 208 thus uses N reference lookups where N is the number of nodes in the branch. For large values of N, coordinating how to modify topic data within the topic tree 208 presents performance implications that are exacerbated due to the potentially high-frequency of traversals needed.

The use case for these kinds of traversals is typically based on the need to apply branch-specific policies, such as security permissions. Branch specific policies allow a given policy to be registered at the root of a branch of the topic tree 208 to which it should apply, and subsequent operations (related to that policy) for a given node will traverse the branch to find the closest registered policy above that node.

The hierarchy index 304 is an abstract data structure maintained by the data distribution system server 104 that shadows the topic tree 208, but provides a sparse representation based purely on branch paths optimized for efficient lookup. The hierarchy index includes pairs of keys and values, where a key corresponds to a path in the topic tree 208 and the value corresponds to a value assigned to the path. For example, in the embodiment shown in FIG. 3, the hierarchy index maps three keys corresponding to three paths within the topic tree 208 to three integer values. The paths are represented by one or more letters corresponding to one or more nodes, with a "/" used to separate nodes in a path, such as paths "a/b" 306A, "a/b/c/d" 308A, and "x/y" 310A. Path "a/b" 306A is mapped to integer value "1" 306B; path "a/b/c/d" 308A is mapped to integer value "2" 308B; and path "x/y" 310A is mapped to integer value "3" 310B.

The hierarchy index may be queried for the closest registered value at or above a particular path. This allows efficient lookup of policies while avoiding the need to traverse the full topic tree 208. The hierarchy index also acts as an atomic data structure, allowing safe multithreaded querying and modification without the need for additional coordination or locking. The lookup performance best case may be described using Big O notation, as follows: $O(1)$, and worst is $O(\log(N))$.

Hierarchy Index Implementation

The hierarchy index provides two general operations: "put," which allows the assignment of a value, such as an integer or a session will, against a given string path, and "find," which returns the nearest found value for a given path. For example, "put" takes a string path (in the format "a/b/c") and a value. For each segment of the path, the hierarchy index will look for any previously created corresponding nodes that match that segment. If a node exists, the operation will recursively apply to any children of that node until no node exists. It will then construct nodes for each missing segment of the path (delineated by "/"). The creation of nodes is handled in an atomic fashion, which allows for values to be directly set, set only if there is no pre-existing value, or set only if no value has been set along the entire branch.

"Find" recursively traverses from the root node of the tree, searching for leaf or child nodes that match the same path segment for that given node's depth (i.e., with path "a/b/c," depth 2, it will search for child nodes with the segment of "b"). When no matching nodes are found, it will return the last found value. Because node modifications are atomic, no locking or synchronisation around the hierarchy index is required for querying.

Initially, the hierarchy index 304 is an empty index. Any "find" operation will return a null result. For example
 find("a")=NULL
 find("a/b")=NULL
 find("a/b/c/d")=NULL The hierarchy index 304 may be populated using a "put" operation. For example, to create the hierarchy index 304 shown in FIG. 3, the following "put" operations may be performed:
 put("a/b", 1)
 put("a/b/c/d", 2)
 put("x/y", 3)

A "find" operation that matches a key will return its value:
 find("a/b")=1
 find("a/b/c/d")=2

A find operation that doesn't match a key will return the value for the nearest matching key, searching up the topic hierarchy:
 find("a/b/c")=1
 find("a/b/c/d/e")=2

If there is no nearest key, the find will return a null result:
 find("a")=NULL

For a hierarchy index 304 used for session wills, each path is associated with a set of sessions that has registered a will for that path. If two sessions, A and B, register wills for the path a/b, the corresponding hierarchy index 304 would have a single entry binding the path a/b to the set {A, B}, where the key is the path a/b and the value is the set of sessions wills A and B.

Session Wills Overview

In operation, the data distribution system server 104 will typically contain a small number of sessions that control and update the topic tree 208, with a significantly larger number of sessions solely consuming this data. As previously discussed, because a topic 302 may have a stateful value which is not tied to any specific session, the lifecycle of a given topic 302 cannot be determined solely by updates. To represent this indirect lifecycle binding between the validity of data for a given topic 302, and the presence of sessions responsible for updating the data associated with that topic 302, sessions may register a session will against specific nodes in the topic tree 208.

A session will binds the lifecycle of the topic node to that of the registering session. When a session that is responsible for updating a particular topic 302 is disconnected, the data distribution system server 104 initiates actions in accordance with the session will to determine how to manage updating the topic 302 and the sub-topics in the topic path. For a particular topic 302, a control client 108D may register a session will that describes the appropriate actions to be taken by the data distribution system server 104 when a registered session for a particular topic 302 is disconnected. For example, a control client 108D may register a session will for a particular topic 302 that instructs the data distribution server 104 to remove the topic 302 and all child nodes in the topic tree 208, when the registered session for that topic 302 disconnects, either deliberately or through unexpected failure. Session wills may be registered at a single point on a branch in the topic tree 208. If a session will is registered at "A/B" 302B, it is disallowed for another session to register at another point in the branch, such as at either "A" 302A or "AB/C" 303C. In another example, multiple session wills may be registered for a single topic 302, in which case, the topic 302 will only be removed once all sessions have disconnected. Sessions may choose to deregister the session will at any time, which will remove the lifecycle binding.

Session Will Implementation

Session wills are maintained by the client session module 206 within a sparse hierarchical data structure referred to as a "session will registry" that shadows the primary topic tree 208, but contains the nodes required to represent a linear tree for each path that a session will has been registered for. In the embodiment shown in FIG. 3, a controlling session 108D provides an API method 400 for registering a session will for a given topic path. A controlling session is a control client 108 that wishes to register a session will against a branch of the topic tree 208. Several controlling sessions can register a session will against the same branch. When the last such session is closed, the session will is executed.

Figure 4:
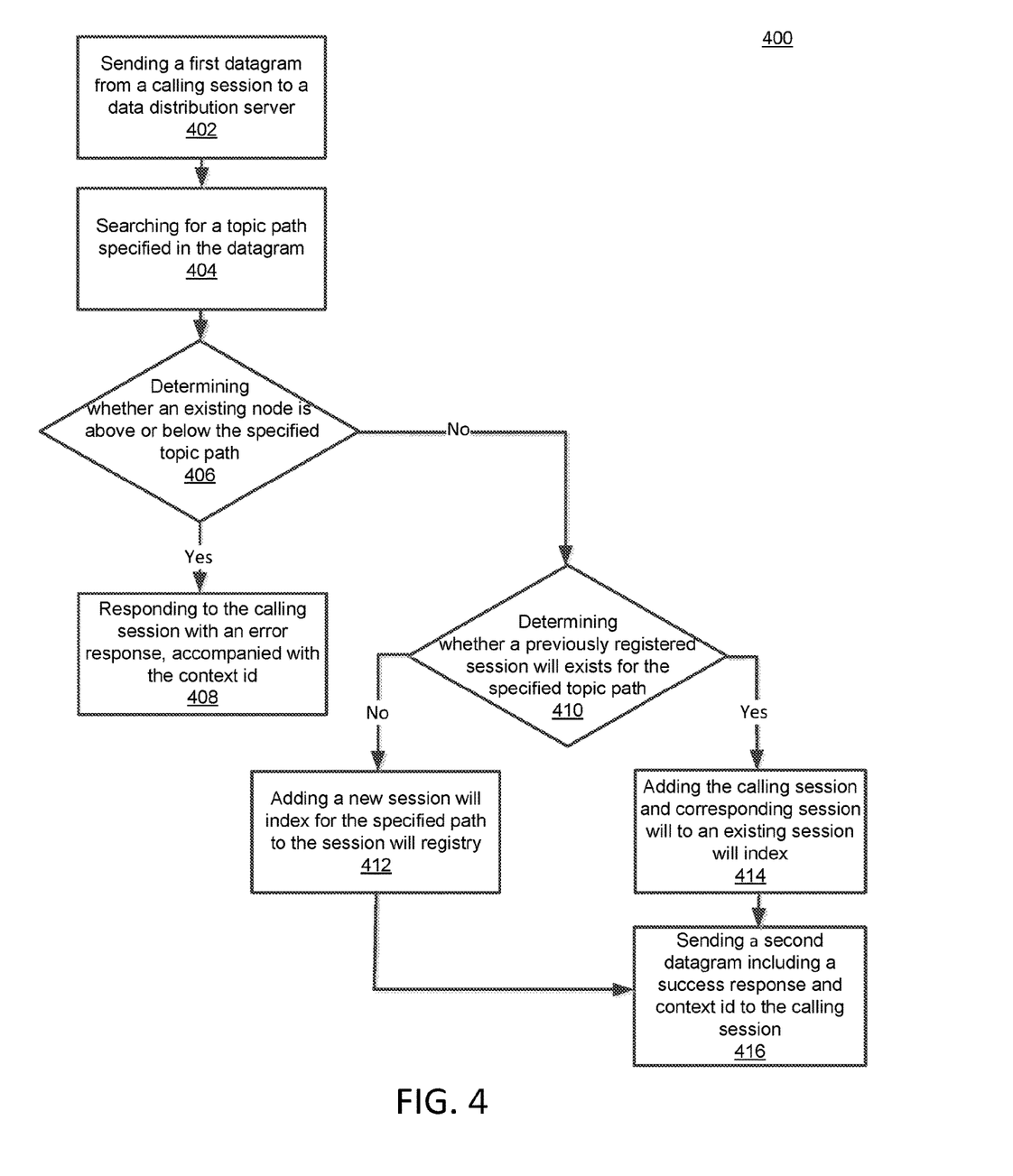
FIG. 4 is a flowchart illustrating a method of registering a session will against a path in a topic tree maintained by a data distribution system server, according to one embodiment.

FIG. 4 is a flowchart illustrating a method of registering a session will against path in the topic tree 208, according to one embodiment. To register a session will against a path in the topic tree 208, a control client 108D establishes a calling session to send 402 a structured data packet, such as a datagram, to the data distribution system server 104. A datagram is a self-contained, independent entity of data carrying sufficient information to be routed from the source to the destination computer without reliance on earlier exchanges between this source and destination computer and the transporting network. The datagram contains the context identifier, topic path, and the session will identifier. The context identifier is an integer generated by the session that uniquely identifies the request. The context identifier is returned by the data distribution system server 104 to the session in a separate datagram indicating the result of registering the session will. The context identifier facilitates asynchronous handling of responses. The data distribution system server 104 receives the datagram, and searches 404 the session will data structure for the topic path specified in the datagram.

The data distribution system server 104 searches 404 for the topic path specified in the datagram. In one implementation, the data distribution system server 104 conducts a linear root-first search of the session will data structure for that path. In other implementations, the data distribution system server 104 may employ other approaches to search a topic path known by those of ordinary skill in the art.

The data distribution system server 104 determines 406 if there is an existing node above or below the topic path specified in the datagram. If the data distribution system server 104 discovers an existing node above or below the topic path, the server 104 responds 408 to the calling session with an error response, accompanied with the context identifier. If no previously registered session will index exists for the topic path, then the data distribution system server 104 adds 410 a new session will index for the topic path to the session will registry. The session will index maintains a map of sessions to an immutable set of session wills. Once the session will index has been added to the session will registry, the data distribution system server 104 adds 412 the calling session and corresponding session will to the index.

If a session will index does exist for the particular topic path, but at the same path as the requested session will, then the data distribution system server adds 414 the calling session and corresponding session will to the existing session will index. Once successfully registered, the data distribution system server 104 sends 416 a datagram to the calling session with a success response and the context identifier.

The session may choose to deregister a session will by sending the same topic path and session will identifier to the data distribution system server 104. The session will identifier is a pair of the type of will, which includes an identifier representing the particular session will to be registered, and the topic path. This information is sufficient to allow the client session module 206 to find the appropriate session will. The data distribution system server 104 will then traverse the session will registry to derive the appropriate session will index for the path. If found, the data distribution system server 104 will remove the session/session will combination from the index.

When the data distribution system server 104 detects that a session has closed its connection to the server, a callback function is invoked which searches the session will index for the previously specified path, and removes the session will for that session. If the session will removed is the last one present for that path, then the appropriate action specific to the session will (i.e., removal of the topic path) will be performed.

SUMMARY

The foregoing description has been presented for the purpose of illustration; it is not intended to be exhaustive or to limit the description to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a non-transitory computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based herein. Accordingly, the disclosure of the embodiments is intended to be illustrative, but not limiting, of the scope of the invention, which is set forth in the following claims

What is claimed is:

1. A method comprising:
    receiving a first datagram from a calling session at a data distribution server, the first datagram including a request for adding a session will to a specified topic path in a topic tree maintained by the data distribution server and a context identifier describing the request, wherein:
        the topic tree comprises a plurality of nodes, each node corresponding to a topic in the topic tree,
        the specified topic path comprises a series of nodes identifing a specified topic, and
        the session will defines management of the series of nodes in the specified topic path when the calling session disconnects from the data distribution server;
    searching the topic tree for the specified topic path included in the first datagram;
    responsive to determining no node in the topic tree exists above or below a last node of the series of nodes in the specified topic path, and determining a previously registered session will does not exist for the specified topic path;
        adding the calling session and the session will to a session will index for the specified topic path, and
        sending a second datagram to the calling session, the second datagram including the context identifier and a response indicating the session will received with the context identifier was added to the session will index.

2. The method of claim 1, further comprising:
    responsive to determining that no node in the topic tree exists above or below the last node of the series of nodes in the specified topic path, adding the session will index for the specified topic path to a session will registry maintained by the data distribution system server.

3. The method of claim 1, further comprising:
    responsive to receiving a request from the calling session to deregister the calling session:
        accessing the specified topic path received in the first datagram;
        traversing a session will registry to identify the session will index corresponding to the specified topic path; and
        removing the calling session and the session will from the session will index in the session will registry.

4. The method of claim 1, further comprising:
    responsive to determining that at least one node in the topic tree exists above or below the last node of the series of nodes in the specified topic path, transmitting, to the calling session, an error response comprising the context identifier included in the first datagram.

5. The method of claim 1, wherein searching the topic tree for the specified topic path included in the first datagram comprises performing a linear root-first search of the session will included in the first datagram.

6. The method of claim 1, further comprising:
    responsive to determining that at least one node in the topic tree exists above or below the last node of the series of nodes in the specified topic path:
        removing the session will from the session will index, and
        transmitting, to the calling session, an error response comprising the context identifier included in the first datagram.

7. The method of claim 1, further comprising:
    detecting, at the data distribution server, that the calling session has disconnected from the data distribution server;
    searching the session will index for the specified topic path in the first datagram received from the calling session; and
    removing the calling session and the session will from the session will index.

8. The method of claim 7, further comprising:
    determining the session will is a last session will included in the session will index for the specified topic path; and
    removing the specified topic path from the session will index.

9. The method of claim 1, further comprising:
    managing the series of nodes in the specified topic path according to the session will after the calling session disconnects from the data distribution server.

10. A computer program product comprising a non-transitory computer-readable storage medium having encoded thereon:
    instructions that when executed by a processor, cause the processor to:
        receive a first datagram from a calling session at a data distribution server, the first datagram including a request for adding a session will to a specified topic path in a topic tree maintained by the data distribution server and a context identifier describing the request, wherein:
            the topic tree comprises a plurality of nodes, each node corresponding to a topic in the topic tree,
            the specified topic path comprises a series of nodes identifing a specified topic, and
            the session will defines management of the series of nodes in the specified topic path when the calling session disconnects from the data distribution server;
        search the topic tree for the specified topic path included in the first datagram;
        responsive to determining no node in the topic tree exists above or below a last node of the series of nodes in the specified topic path, and determining a previously registered session will does not exist for the specified topic path:
            add the calling session and the session will to a session will index for the specified topic path, and
            send a second datagram to the calling session, the second datagram including the context identifier and a response indicating the session will received with the context identifier was added to the session will index.

11. The computer program product of claim 10 wherein the instructions, when executed, further cause the processor to:
    responsive to determining that no node in the topic tree exists above or below the last node of the series of nodes in the specified topic path, add the session will index for the specified topic path to a session will registry maintained by the data distribution system server.

12. The computer program product of claim 10 wherein the instructions, when executed, further cause the processor to:
  responsive to receiving a request from the calling session to deregister the calling session:
    access the specified topic path received in the first datagram;
    traverse a session will registry to identify the session will index corresponding to the specified topic path; and
    remove the calling session and the session will from the session will index in the session will registry.

13. The computer program product of claim 10 wherein the instructions, when executed, further cause the processor to:
  responsive to determining that at least one node in the topic tree exists above or below the last node of the series of nodes in the specified topic path, transmit, to the calling session, an error response comprising the context identifier included in the first datagram.

14. The computer program product of claim 10, wherein searching the topic tree for the specified topic path included in the first datagram comprises performing a linear root-first search of the session will included in the first datagram.

15. The computer program product of claim 10 wherein the instructions, when executed, further cause the processor to:
  responsive to determining that at least one node in the topic tree exists above or below the last node of the series of nodes in the specified topic path:
    remove the session will from the session will index, and
    transmit, to the calling session, an error response comprising the context identifier included in the first datagram.

16. The computer program product of claim 10 wherein the instructions, when executed, further cause the processor to:
  detect, at the data distribution server, that the calling session has disconnected from the data distribution server;
  search the session will index for the specified topic path in the first datagram received from the calling session; and
  remove the calling session and the session will from the session will index.

17. The computer program product of claim 16 wherein the instructions, when executed, further cause the processor to:
  determine the session will is a last session will included in the session will index for the specified topic path; and
  remove the specified topic path from the session will index.

18. The computer program product of claim 10 wherein the instructions, when executed, further cause the processor to:
  manage the series of nodes in the specified topic path according to the session will after the calling session disconnects from the data distribution server.

* * * * *

UNITED STATES PATENT AND TRADEMARK OFFICE
CERTIFICATE OF CORRECTION

PATENT NO. : 10,666,738 B2  
APPLICATION NO. : 15/765487  
DATED : May 26, 2020  
INVENTOR(S) : Aston et al.

Page 1 of 1

It is certified that error appears in the above-identified patent and that said Letters Patent is hereby corrected as shown below:

In the Claims

Column 9, Claim 1, Line 19, delete "identifing" and insert --identifying--.

Column 10, Claim 10, Line 40, delete "identifing" and insert --identifying--.

Signed and Sealed this  
Twenty-ninth Day of December, 2020

Andrei Iancu  
*Director of the United States Patent and Trademark Office*